Sept. 7, 1965          D. E. DALLAS, JR.          3,204,384
SKIN PACKAGING METHOD AND APPARATUS
Filed Sept. 13, 1962          2 Sheets-Sheet 1
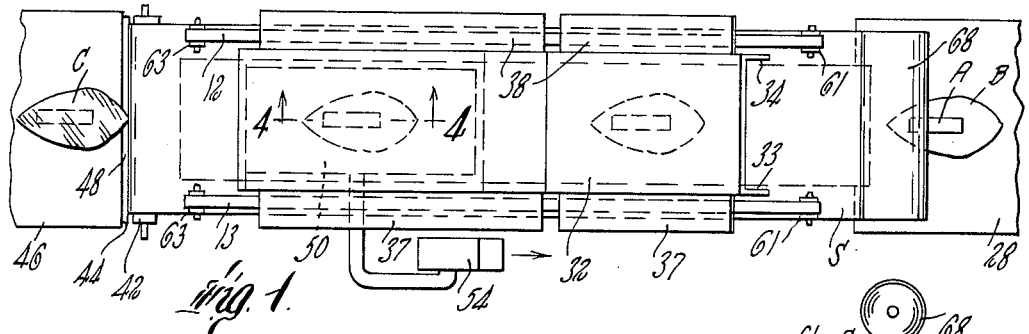
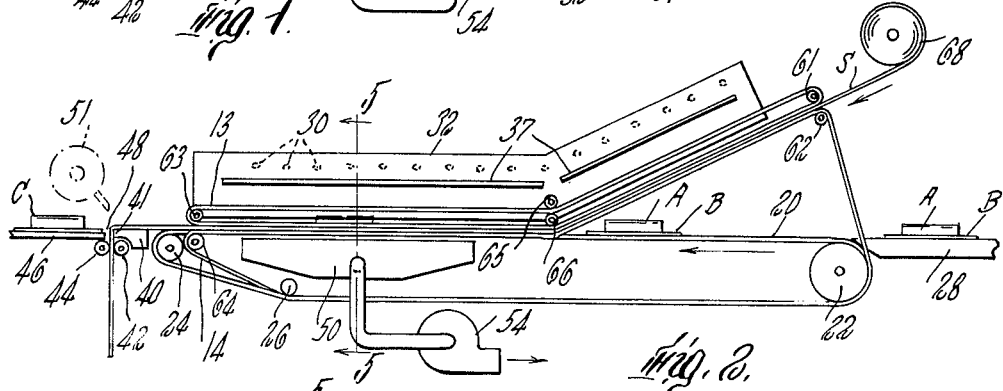
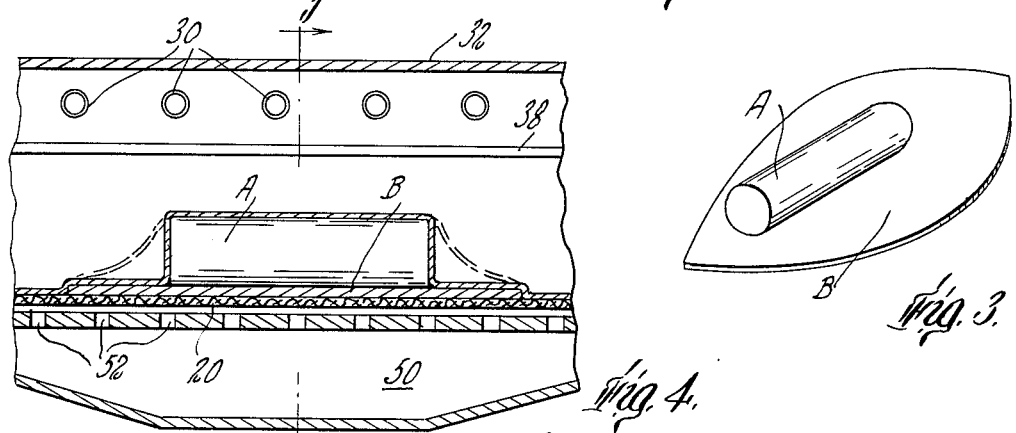
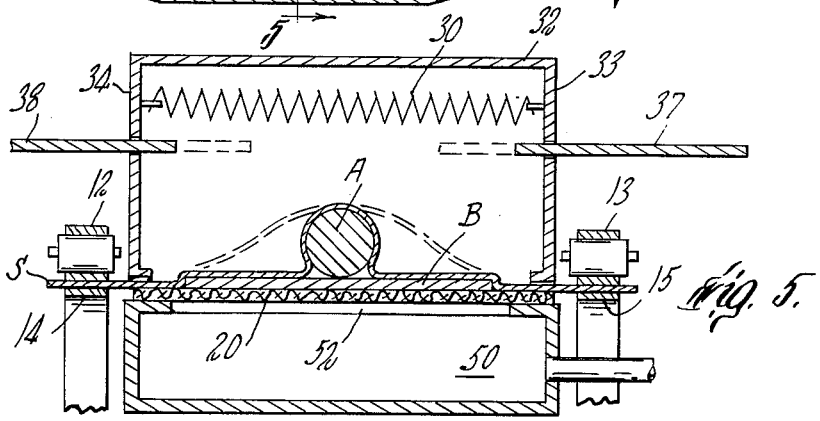

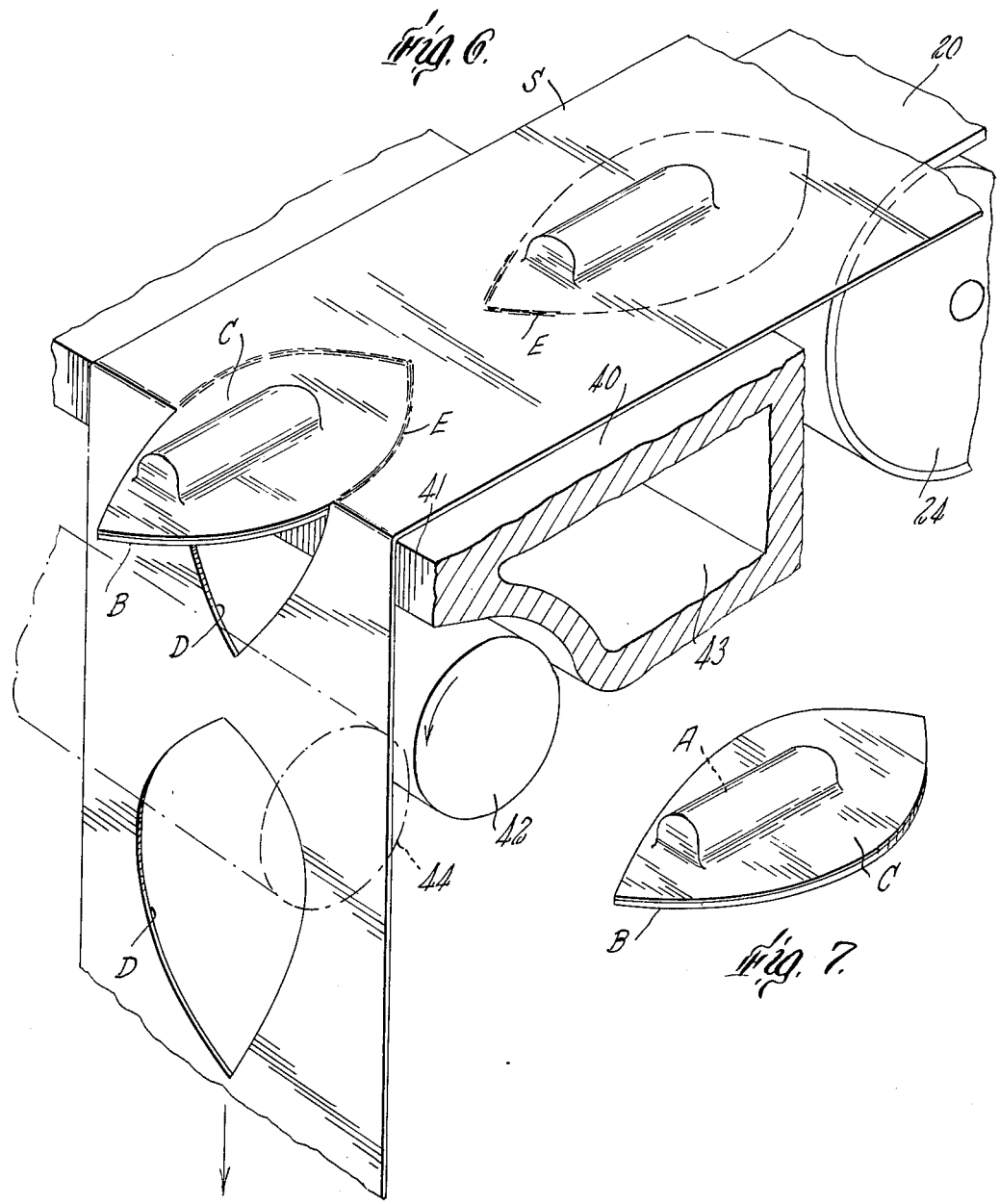

United States Patent Office 3,204,384
Patented Sept. 7, 1965

3,204,384
SKIN PACKAGING METHOD AND APPARATUS
Donald E. Dallas, Jr., Dover, Mass., assignor to Ludlow Corporation, Needham Heights, Mass., a corporation of Massachusetts
Filed Sept. 13, 1962, Ser. No. 223,492
13 Claims. (Cl. 53—22)

This invention relates to skin packaging and more particularly to methods and apparatus for continuous skin packaging and trimming of skin packages.

Skin packaging heretofore has been carried out by means of apparatus, usually manually operated, of the step-by-step type wherein each individual package or group thereof was handled as a single unit, and thereafter trimmed of excess material or cut up as one or more separate operations. Although the packages produced by such operations were satisfactory, the amount of manual labor involved made them relatively expensive to manufacture, and, in addition, the apparatus involved was ill-adaptable for use as a tie-in packaging step with known types of continuously operating production line machines, simply because it could not be operated at a high enough speed to be directly fed by such high speed machines. Nor was a simple speeding up of the step-by-step apparatus a solution to the problem, since the plastic material used required a significant time for its heat softening for adequate adhesion, and the required time of operation was hence limited by this factor to the extent that the desired high speed of operation could not be achieved.

Accordingly, it is a major object of the present invention to provide novel methods and apparatus capable of continuous rather than step-by-step operation whereby completely automated high speed skin packaging may be carried out.

It is a particular feature of the invention that it further makes possible the automatic, high speed trimming of discrete packages of unconventional shapes, in addition to conventional rectangular shapes.

These objects and features of the invention are accomplished, in general, by novel means and methods for advancing, preferably continuously, a generally horizontal strip, preferably of adherent plastic sheet material, of indeterminate length in a direction along its length while simultaneously advancing a baseboard, which may have an article assembled thereon, in a direction to contact said strip to form said strip against said baseboard and article assembled thereon. The latter function is provided by means, such as an underlying vacuum chamber, adjacent the contact of said strip with said baseboard for urging said strip into adhering contact with said baseboard. Means for heating said strip may be positioned in advance of the contact of said strip with said baseboard so that the strip may be rendered easily deformable to aid its formation and adherence, with said strip being supported solely along its lateral edges during such heating. Preferably, the heating is limited to the central portion of the strip to avoid softening the lateral edges at which the strip is supported.

The methods and apparatus of the invention are especially adapted for handling discrete backboards of unconventional shapes, wherein means are provided for advancing discrete spaced baseboards having articles assembled thereon in a direction intersecting and crossing the plastic strip and through the central portion of said strip while leaving the edge portions intact, discrete areas of the strip simultaneously being removed from said central portion by adherence to said baseboards to cover said baseboard and article, leaving successive spaced apertures generally corresponding to the configuration of said baseboards in the strip of plastic material as the strip of plastic material passes beyond the crossing point of said strip and the baseboards. Preferably, this aspect of the invention is accomplished by cooling the portions of the plastic strip between the backboards so that the portions of the film adhered to said backboards, or at least their extreme edges, are maintained at a higher temperature than the remaining portions of the strip, to facilitate tearing of the strip along the softened line of plastic around the edges of the backboard upon divergence, preferably abrupt, of said strip and backboard.

Further objects and features of the invention will become apparent from the following description of preferred embodiments thereof, together with the accompanying drawings, wherein:

FIG. 1 is a plan view of apparatus according to the present invention;

FIG. 2 is a side view of the apparatus of FIG. 1;

FIG. 3 is an isometric view of an article assembled on a backboard as a preliminary step in forming a skin package according to the present invention;

FIG. 4 is an enlarged partial cross section of the apparatus of FIGS. 1 and 2 taken on line 4—4 thereof;

FIG. 5 is an enlarged partial cross section of the apparatus of FIGS. 1 and 2 taken on line 5—5 thereof;

FIG. 6 is a diagrammatic view showing a trimming operation according to the invention; and FIG. 7 is an isometric view of a completed skin package typically resulting from the apparatus and methods of the present invention.

Referring to the drawings, the apparatus, in general, comprises two transversely spaced pairs of belts 12, 14 and 13, 15 for gripping at its edges and advancing a strip S of plastic sheet material for application to a baseboard B having an article A assembled thereon supported on a porous conveyor belt 20 positioned generally parallel to and centrally between the pairs of strip supporting belts 12, 14 and 13, 15. Heating means, such as a plurality of resistance heating units 30 within a suitable hood 32 are provided above the gripping surfaces of belts 12, 14 and 13, 15 for heating strip S to a deformable, adherent condition. A vacuum chamber 50 is provided beneath porus conveyor belt 20 for urging the deformable heated strip S into adhering contact with a baseboard B to form the strip S against baseboard B and article A assembled thereon. For severing strip S, providing trimmed edges thereof coextensive with the edges of baseboards B with the formed strip S adhered thereto, after passing beyond the gripping zone of strip supporting belts, 12, 14 and 13, 15 and beyond conveyor belt 20, the strip and baseboards are passed over the abrupt edge 41 of chilled stripper bar 40, the strip S being pulled downward therefrom by a pair of stripper rolls 42, 44, while the trimmed baseboards continue in a straight line and pass onto the surface of output tray 46 which is longitudinally spaced from stripper bar 40 by a slot 48. With this arrangement, the backboards B are advanced into contact with the strip S, and in effect intersect the strip and pass through its central portion, while leaving the edge portions of the strip intact. Discrete areas of the strip S are thus progressively removed from the central portion of strip S by adherence to the baseboard B, providing a skin covering C over the baseboard and its article A (FIG. 7) with successive spaced apertures D being produced in strip S as it passes abruptly over and beyond edge 41, such edge defining the crossing point at the intersection of strip S and backboards B. If a continuous backboard be used rather than discrete backboards B as shown, a rotary cutter knife 51 may be utilized to cut the backboard into discrete sections as required, or the continuous backboard with its skin covering may be taken up, in its entirety, by some appropriate means (not shown).

More specifically as to the apparatus shown in the drawings, the central conveyor belt 20 is preferably generally horizontal and is trained around entrance and exit end pulleys 22, 24, respectively and a guide pulley 26, providing an upper flight for supporting a baseboard B with an article thereon. Pulley 22 is driven, by any suitable means (not shown) to move the upper flight of belt 20 from the entrance end to the exit end of the apparatus, in the direction of the arrow in FIG. 2, at a continuous predetermined speed. An inlet feeder 28 may be provided for feeding articles A on baseboards B to conveyor belt 20, and an outlet tray 46, in conjunction with bar 40, is provided for removing baseboards and articles covered by a plastic skin C. A vacuum chamber 50, having perforations 52 in its upper surface, underlies a portion of conveyor belt 20 adjacent its exit end, said chamber being provided with a suction pump 54 for creating a sub-atmospheric pressure therein for communication to the upper surface of porous belt 20. Said belt may be of any porous or foraminous construction to enable a stream of air to be drawn therethrough into chamber 50.

The plastic strip gripping, transversely-spaced, pairs of belts 12, 14 and 13, 15 are provided in the form of contacting flights in two sections, a section substantially parallel to and in a plane with conveyor belt 20 adjacent the outlet end of the apparatus, and a section at an angle to and converging toward belt 20 adjacent the inlet end of the vessel. For this purpose, the pairs of belts are trained around entrance pulleys 61, 62, exit pulleys 63, 64, and intermediate pulleys 65, 66, the latter defining the transverse line of intersection of strip S with a baseboard B, although the strip S does, as a practical matter, come into contact with a baseboard B and its article A somewhat in advance of that line because of the droop of the strip and the height of baseboard B and its article A. Means for supplying a strip S of plastic sheet material of indeterminate length in a direction along its length for gripping between belts 12, 14 and 13, 15 is provided by a roll 68 of such material mounted in advance of the entrance end of the apparatus, just ahead of pulleys 61, 62. At least some of pulleys 61, 62, 63, 64, 65, 66 are driven at a speed to advance belts 12, 13, 14, 15 at the same speed as conveyor belt 20 is moved.

In order that the strip S of plastic may continuously and progressively be softened as it advances into contact with baseboards B on conveyor belt 20, the heater units 30 within their hood 32 extend for a substantial distance along the downwardly inclined flights of strip edge gripping belts, in advance of the transverse line of intersection defined above, as well as along a major portion of the horizontal flights of said belts, above vacuum chamber 50. Preferably, the sides 33, 34 of hood 32 extend downwardly to a point just short of contact with strip S, both in the angular portion and the horizontal portion, closely overlying conveyor belt 20, to protect the edges of strip S gripped by belts 12, 13, 14, 15 from being softened by heating units 30. Also, preferably, shutters 37, 38 are provided beneath heating units 30, which shutters may be closed manually or automatically as desired, such as when the apparatus is stopped, in order that the strip may not be melted, and other undesirable heat damage precluded.

A particularly important aspect of the methods and apparatus of the invention resides in its ability automatically to trim discrete backboards of unusual shapes, as well as mixtures of a variety of shapes, all as part of the skin packaging operation. To this end, the apparatus provides, beyond the exit ends of the edge gripping and conveyor belts, a chilled stripper bar 40 having a central passage 43 for cooling fluid, said bar being separated from outlet tray 46 by a vertical slot 48 having a pair of stripper rolls 42, 44 positioned immediately therebelow. Such stripper rolls are operated at a speed at least as great as the speed of movement of the belts, to pull the apertured strip downward as backboards B pass through it, preferably at a somewhat higher speed to provide additional tension as is necessary to compensate for elongation of the web S due to the aperture D which must be compensated for after its creation. To this end, it is helpful for rolls 42, 44 to be as close to line 41 as possible, to decrease the degree of necking of strip S.

In operation, as has been explained in some degree above, the belts are operated continuously and at substantially equal speed to advance baseboards B with articles A assembled thereon beneath the descending strip S, which has been softened to a deformable and adherent state by heaters 30, until the strip comes into contact with the baseboard for formation by suction applied to the under side of baseboards B by vacuum chamber 50 acting through porous conveyor belt 20. Thereafter, the portion of the strip in contact with bar 40 is cooled rapidly, that is the portions of the strip between the backboards, while the portions of the strip adhered to the backboards at its extreme edges along line E continue to be maintained at a higher temperature to facilitate tearing along line E. The strip is then abruptly pulled downwardly over edge 41 to sever it along line E and away from the edges of the backboards B as they pass through the strip onto the outlet tray 46. The abrupt divergence of the strip material from the backboards along edge 41 thus utilizes an abrupt differential temperature gradient across line E to separate the strip along such line at the backboard edge.

The methods of the invention, then, insofar as the progressive application of a continuously moving strip of plastic sheet material to a backboard is concerned, comprise the steps of advancing a strip of plastic sheet material of indeterminate length in a direction generally along its length, advancing a baseboard having an article assembled thereon in a direction to contact said strip, progressively heating said strip preferably along its central portion only while supporting it solely and continuously along its edges, and then urging said strip into adhering contact with said baseboard to form said strip against said baseboard and article assembled thereon. Insofar as the stripping of excess film from discrete skin packages or backboards is concerned, this is accomplished in a continuous manner, according to the methods of the invention, by advancing discrete spaced baseboards in a direction through the central portion of said strip of heated, softened plastic material while leaving the edge portions of said plastic material intact, then cooling the portions of the strip between the baseboards without cooling the portions adhered to the baseboards, to provide a line of abrupt temperature gradient around the edges of the baseboards. By so doing, discrete areas of said plastic material are removed from the central portion of the strip by adherence to said baseboards, to cover a baseboard and an article assembled therewith, with successive spaced apertures generally corresponding to the configuration of said baseboards being produced in said strip of plastic material as said strip passes beyond the intersection of said strip with said baseboards. The above recited methods of the invention may be carried out by means of the above described apparatus, as is apparent from its description and operation as above set forth, as well as by other apparatus not disclosed herein, or even manually.

Thus, it will be seen that the invention provides novel methods and apparatus for continuous skin packaging operations. Various modifications, thereof, not herein disclosed, yet within the spirit thereof and the scope of the appended claims, will be apparent to those skilled in this art.

What is claimed is:

1. In a method of continuous skin packaging, the steps of advancing a strip of plastic sheet material of indeterminate length in a direction generally along its length, advancing a baseboard having an article assembled thereon in a direction to contact said strip, progressively heating said strip, urging said strip into adhering contact with said baseboard to form said strip against said baseboard and article assembled thereon, and further advancing said baseboard in a direction intersecting said strip and through the central portion of said strip to remove a discrete area of said strip including the portions in adhering contact with said baseboard from said strip as said strip passes beyond the intersection of said strip with said baseboard while leaving the edge portions of said strip intact, so that the removed discrete area of said strip covers said baseboard and an article assembled thereon, while the resulting aperture in said strip generally corresponds to the configuration of said baseboard.

2. In a method according to claim 1, wherein said strip is heated along its central portion only while supporting said strip solely and continuously along its edges.

3. In a method according to claim 1, further including the step of heating at least said discrete area to be adhered to said baseboard prior to advancing said baseboards through said strip, and wherein said baseboard is advanced through said strip by abrupt divergence of said strip from said baseboard while maintaining said discrete area to be adhered to said baseboard at a higher temperature than the remaining area of said strip.

4. In a method of skin packaging for covering baseboards with a plastic film material, the steps of advancing a strip of plastic material of indeterminate length in a direction generally along its length, advancing discrete spaced baseboards in a direction intersecting said strip, urging said strip into adhering contact with said baseboard, and further advancing said baseboards through the central portion of said strip while maintaining the edge portions of said strip intact, discrete areas of said strip being removed from its central portion by adherence to said baseboards to cover a baseboard, with successive spaced apertures generally corresponding to the configuration of said baseboards being produced in said strip as it passes beyond the intersection of said strip with said baseboards.

5. In a method for severing from a strip of heated plastic material having adhered thereto discrete spaced baseboards, the steps of cooling said strip and then progressively moving said baseboards through the central portion of said strip while leaving the edge portions of said strip intact, while maintaining at least the extreme edges of said discrete areas adhered to said baseboards at a higher temperature than the remaining areas of said strip, each discrete area of said strip being removed from its central portion adhering to and covering a baseboard, with successive spaced apertures generally corresponding to the configuration of said baseboards being produced in said strip as said strip passes beyond the intersection of said strip with said baseboards.

6. In a method for severing from a strip of heated plastic material having adhered thereto discrete spaced baseboards, the steps of heating said strip followed by cooling the portions of said strip between said baseboards and immediately thereafter progressively moving said baseboards through the central portion of said strip by abrupt divergence of said baseboards and said strip while leaving the edge portions of said strip intact, while maintaining at least the extreme edges of said discrete areas adhered to said baseboards at a higher temperature than the remaining areas of said strip, each discrete area of said strip being removed from its central portion adhering to and covering a baseboard, with successive spaced apertures generally corresponding to the configuration of said baseboards being produced in said strip as said strip passes beyond the intersection of said strip with said baseboards.

7. In a continuous skin packaging machine, means for advancing a strip of plastic sheet material of indeterminate length in a direction along its length, means for advancing a baseboard having an article assembled thereon in a direction to contact said strip, means adjacent the contact of said strip with said baseboard for urging said strip into adhering contact with said baseboard to form said strip against said baseboard and an article assembled thereon, and means for severing from the central portion of said strip of plastic sheet material a discrete area generally corresponding to the configuration of said baseboard by moving said baseboard through the central portion of said strip of plastic sheet material while leaving the edge portions of said strip intact.

8. In a continuous skin packaging machine, means for advancing a strip of plastic sheet material of indeterminate length in a direction along its length solely by contact with the longitudinal edges of said strip, means for advancing a baseboard having an article assembled thereon in a direction to contact said strip, means for heating the central portion only of said strip positioned in advance of the contact of said strip with said baseboard, means adjacent the contact of said strip with said baseboard for urging said strip into adhering contact with said baseboard to form said strip against said baseboard and an article assembled thereon, and means for severing from the central portion of said strip of plastic sheet material a discrete area generally corresponding to the configuration of said baseboard by moving said baseboard through the central portion of said strip of plastic sheet material while leaving the edge portions of said strip intact.

9. In a skin packaging machine, means for severing from a heated strip of plastic material having adhered thereto discrete spaced baseboards comprising means for cooling the portions of said strip between said baseboards while maintaining at least the extreme edges of the plastic material adhered to said baseboards at a higher temperature than said portions of said strip between said baseboards to provide a line of abrupt temperature gradient around the edges of said baseboards, and means for moving said baseboards through the central portion of said strip while leaving the edge portions of said strip intact, discrete areas of said strip being removed from its central portion by adherence to said baseboards to cover a baseboard and an article assembled therewith, with successive spaced apertures generally corresponding to the configuration of said baseboards being produced in said strip as said strip passes beyond the intersection of said strip with said baseboards.

10. In a skin packaging machine, means for advancing a strip of plastic sheet material of indeterminate length in a direction generally along its length, means for advancing discrete spaced baseboards having articles assembled thereon in a direction intersecting said strip, means for heating said strip positioned in advance of the contact of said strip with said baseboards, means adjacent the contact of said strip with said baseboards for urging said strip into adhering contact with said baseboards to form said strip against a baseboard and an article assembled thereon, means for cooling the portions of said strip between said baseboards, means for severing said strip from the edges of said baseboards including means for moving said baseboards through the central portion of said strip while leaving the edge portions of said strip intact, discrete areas of said plastic material being removed from said central portion by adherence to said baseboards to cover a baseboard and an article assembled therewith, with successive spaced apertures generally corresponding to the configuration of said baseboards being produced in said strip as said strip passes beyond the intersection of said strip with said baseboards.

11. In a continuous skin packaging machine, two transversely spaced pairs of opposed belts for supporting and advancing a generally horizontal strip of plastic sheet material of indeterminate length in a direction along its length by gripping it between the belts of said pairs solely along its longitudinal edges, a porous conveyor belt means positioned between said pairs of belts for advancing a baseboard having an article assembled thereon in a direction to contact said strip, means for heating the central portion only of said strip positioned in advance of the contact of said strip with said baseboard, vacuum plate means adjacent the contact of said strip with said baseboard for urging said strip into adhering contact with said baseboard to form said strip against said baseboard and an article assembled thereon, means for cooling the portions of said strip between said baseboards, means for severing said strip, providing trimmed edges thereof coextensive with the edge of said baseboard, including means for moving said baseboards through the central portion of said strip while leaving the edge portions of said strip intact, discrete areas of said strip being removed from said central portion by adherence to said baseboards to cover a baseboard and an article assembled therewith, with successive spaced apertures generally corresponding to the configuration of said baseboards being produced in said strip as said strip passes beyond the intersection of said strip with said baseboards.

12. In a method of skin packaging for covering baseboards with a plastic film material, the steps of advancing a strip of plastic material of indeterminate length in a direction generally along its length, advancing discrete spaced air-permeable baseboards in a direction of intersect said strip, creating a pressure differential across said strip and said baseboard to draw said strip down into adherence with said baseboard, and further moving said baseboards through the central portion of said strip to remove discrete areas of said strip that include those oprtions adhering to said baseboards along the periphery of said baseboards from said strip while leaving the edge portions of said strip intact so that successive spaced apertures generally corresponding to the configuration of said baseboards are produced in said strip as said strip passes beyond the area of intersection of said strip with said baseboards.

13. In a continuous skin packaging machine, means for advancing a strip of plastic sheet material of indeterminate length in the direction generally along its length, means for advancing a discrete baseboard having an article assembled thereon in a direction intersecting said strip for contact with said strip, means adjacent the contact of said strip with said baseboard for urging said strip to adhering contact with said baseboard to form said strip against a baseboard and an article assembled thereon, means to provide a line of abrupt temperature gradient in said sheet of plastic material around the edges of said baseboard, and means for severing said strip along said line of abrupt temperature gradient including means for moving said baseboard through the central portion of said strip to provide a discrete area of plastic material adhered to said baseboard to cover the baseboard and an article assembled thereon with said discrete area having trimmed edges generally co-extensive with the edge of said baseboard.

References Cited by the Examiner

UNITED STATES PATENTS

| | | | |
|---|---|---|---|
| 2,497,212 | 2/50 | Donofrio | 53—141 X |
| 2,590,379 | 3/52 | Cloud | 53—30 X |
| 2,597,041 | 5/52 | Stokes | 53—141 |
| 2,622,380 | 12/52 | Snyder | 53—141 X |
| 2,984,058 | 5/61 | Meissner | 53—141 X |
| 3,071,905 | 1/63 | Morse | 53—22 |

TRAVIS S. MCGEHEE, *Primary Examiner.*